June 7, 1932.   G. C. TROTTER   1,862,486
TAPPING FASTENER
Filed July 20, 1931
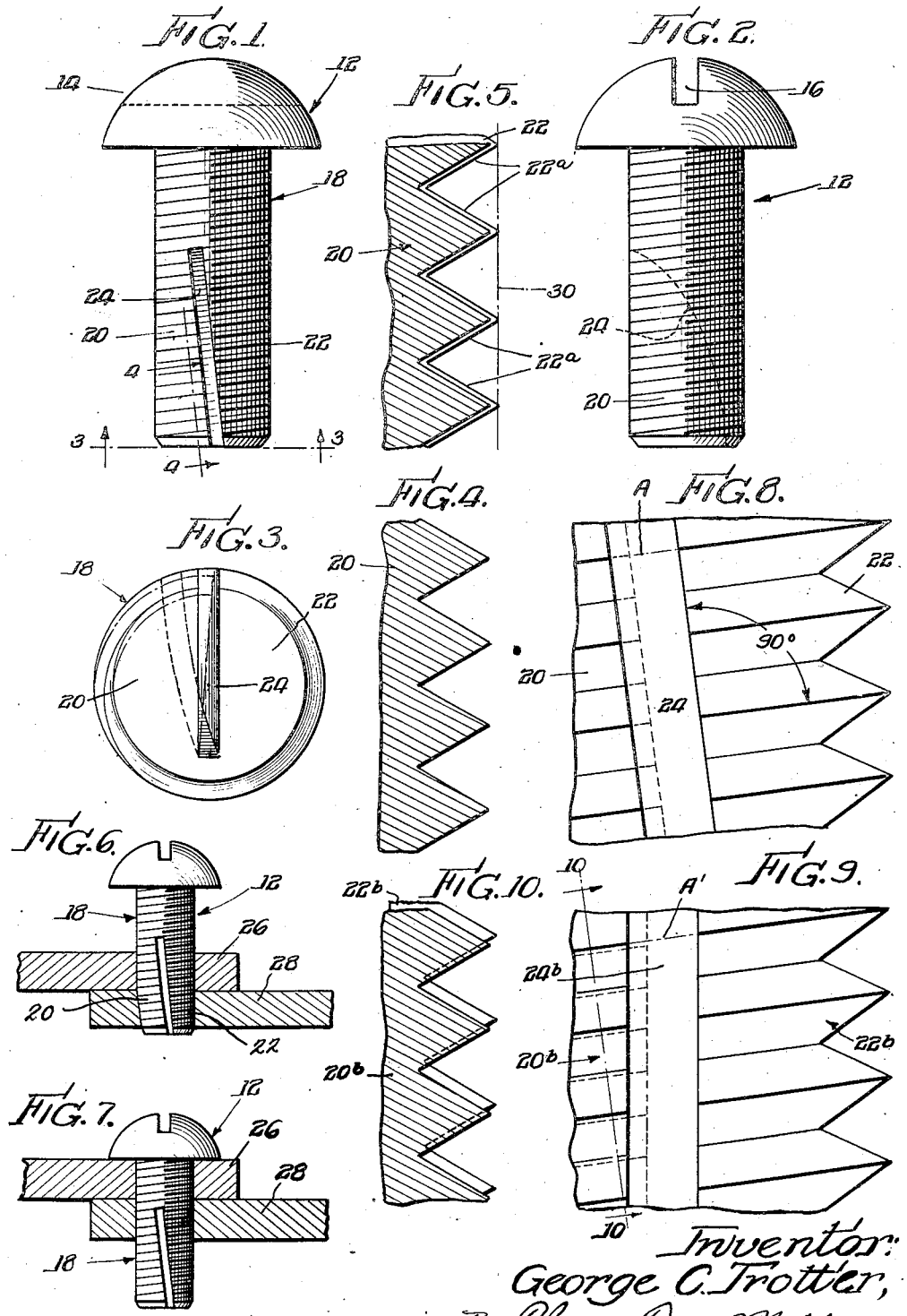
Inventor:
George C. Trotter,
By Cheever, Cox & Moore attys.

Patented June 7, 1932

1,862,486

UNITED STATES PATENT OFFICE

GEORGE C. TROTTER, OF CHICAGO, ILLINOIS, ASSIGNOR TO SHAKEPROOF LOCK WASHER COMPANY, OF CHICAGO, ILLINOIS, A CORPORATION OF DELAWARE

TAPPING FASTENER

Application filed July 20, 1931. Serial No. 551,904.

My invention relates generally to tapping fasteners or self-tapping screws, and more particularly to self-tapping screws equipped with standard threads.

One of the objects of my present invention is to eliminate the necessity of tapping apertures prior to the insertion of a screw therein, and to this end I propose to provide a self-tapping screw or fastener of improved practical construction, whereby screws equipped with standard threads may be applied to a work piece without the necessity of previously performing a tapping operation.

Another object of my present invention is to provide a self-tapping screw, in which a section of the screw is adapted to yield when said screw is applied to the aperture in a work piece so as to facilitate the tapping operation.

A still further and more specific object of my invention is to provide a self-tapping screw as above set forth, in which the screw body is divided into a pair of spaced sections, one of which is adapted to yield toward the other in applying the screw to the aperture of a work piece without causing any misalinement of the threads in said sections and thereby preventing a reaming action when the screw is turned within the work piece.

Still more specifically, my invention contemplates the provision of self-tapping screws having a recess extending longitudinally of the screw body so as to divide said body into a pair of screw sections, said recess extending in a direction perpendicular to the screw threads, whereby to enable one of said sections to yield toward and away from the other without subjecting the companion threads in said sections to any misalinement.

The foregoing and numerous other objects and advantages will be more apparent from the following detailed description when considered in connection with the accompanying drawing, wherein—

Figure 1 is a side elevational view of a screw constructed in accordance with the teachings of my present invention;

Figure 2 is a side elevational view of said screw taken from the right of Figure 1;

Figure 3 is a view of the underside of the screw in Figure 1, said view being taken substantially along the line 3—3 of Figure 1, the dot-and-dash lines in Figure 3 disclosing the position occupied by one of the screw sections when said screw is being applied to a work piece;

Figure 4 is an enlarged fragmentary sectional view of the screw body taken substantially along the line 4—4 of Figure 1;

Figure 5 is a similar fragmentary sectional view taken along the same line when the yieldable screw section has been deflected in response to the application of the screw to the work piece, said view being shown to more clearly disclose the cutting edges of the threads in the section oppositely disposed from the yieldable section;

Figure 6 discloses my improved self-tapping screw during its initial association with a pair of plates to be connected by the screw;

Figure 7 is a view similar to Figure 6, disclosing the screw after the head thereof has been clamped against one of the plates;

Figures 8 and 9 are enlarged fragmentary portions of screws to more clearly illustrate by way of comparison the manner in which the threads in a screw embodying my invention maintain their alinement, even though one of the screw sections is shifted toward its companion section, the disclosure in Figure 8 representing a screw having the recess therein disposed at right angles to the threads, and the screw in Figure 9 having the recess disposed in substantial parallelism with the screw axis; and Figure 10 is a fragmentary sectional view taken substantially along the line 10—10 of Figure 9, to disclose the misalinement of the companion threads in the screw sections which takes place when the recess in the screw body is not perpendicular to the screw threads.

Referring now to the drawing more in detail, wherein like numerals have been employed to designate similar parts throughout the various figures, it will be seen that one embodiment of my invention contemplates the provision of a screw designated generally by the numeral 12. This screw includes a head 14 provided with the usual slot 16 and a screw body 18 which is divided into a pair of screw sections 20 and 22 by a recess 24. For the purpose of illustrating one practical embodiment of my invention I have disclosed the thread body 18 made up of standard screw threads. Although the invention is in no sense limited to a screw having threads of the standard type, the fact that said invention enables a standard screw to be rendered self-tapping is believed to present a structural feature which clearly differentiates it from conventional self-tapping screws with which I am familiar.

Particular attention is directed to the fact that the recess 24 extends partially across the screw body and that the plane thereof is perpendicular to the thread helix, as clearly shown in Figure 8. Assume that the screw shown in Figure 8 is applied to a pair of work pieces or plates 26 and 28, Figure 6. The plate 28 is initially provided with an aperture having a diameter which will permit threads to be cut or formed therein by the advancing end of the screw body 18. As the tip of the screw body 18 enters the upper portion of the aperture within the plate 28, the screw section 20 is urged to the dot-and-dash position shown in Figure 3. In other words, the screw section 20 is yieldable and shifts toward its companion screw section 22 as a result of the frictional engagement of the threads in the section 20 with the internal surface of the aperture within the work piece 28.

The deflection of the screw section 20 causes the threads thereof to be shifted inwardly from the normal cylindrical periphery of the screw body 18, and this is clearly shown in Figure 5. In this figure it will be seen that the threads of the section 20 are positioned inwardly from the normal cylindrical confines of the screw threads which are designated by a dot-and-dash line 30 in Figure 5. The threads in the section 22 maintain their normal cylindrical form and hence provide a plurality of cutting edges 22a, which function as tapping teeth during the rotative advancement of the screw body. In addition to the cutting action of the edges 22a, the peripheral surfaces of the screw threads cause a certain amount of metallic flow, and it is the combined flowing and cutting of the metal which renders the screw self-tapping.

It is very important that the slot or recess 24 extending axially of the screw body be disposed at right angles with respect to the thread helix, as clearly shown in Figures 1 and 8. This fact will be apparent when it is seen that by having this perpendicular disposition of the recess and helix, the screw section 20 is adapted to shift toward and away from the section 22 without causing any misalinement of the companion threads in said sections. In Figures 8 and 9 I have endeavored by way of comparison to more clearly illustrate the difference in functional characteristics between a screw having a recess disposed at right angles with respect to the thread helix as shown in Figure 8 and a screw having said recess disposed in substantial parallelism with the screw axis. Referring to Figure 8 it will be seen that the dotted lines disclose the position occupied by the threads in the screw section 20 when said section has been shifted toward the companion section 22 in the manner described above. It will be seen that by reason of the perpendicular disposition of the recess 24 with respect to the thread helix, the section 20 shifts about an axis which is substantially perpendicular to the thread helix and therefore the threads in the section 20 are shifted without disturbing the position of alinement of said threads with the companion or continuing threads in the section 22. In other words, the alinement of the companion threads in the screw sections 20 and 22 is maintained regardless of the position to which the section 20 may be shifted. In Figure 8 a dot-and-dash line A near the upper portion of the figure serves to indicate the position of alinement which is maintained between the uppermost thread in the section 20 and the companion uppermost thread in the section 22. Referring now to Figure 9, it will be seen that I have disclosed a screw which is divided into a pair of screw sections 20b and 22b, which correspond to the sections 20 and 22 of Figure 8. These sections 20b and 22b are separated by a recess or slot 24b which is not perpendicular to the thread helix, but extends in substantial parallelism with the axis of the screw body. Assume that the section 20b is shifted toward the section 22b as described above in connection with the sections 20 and 22, and that the section 20b reaches the dotted position shown in Figure 9. It will be seen that the section 20b yields about an axis which is not disposed at right angles with respect to the thread helix, and therefore the threads in the section 20b are thrown out of alinement with the threads in the section 22b. This fact may be clearly observed from the dot-and-dash line A as shown at the upper end of Figure 9, which extends between the uppermost companion threads prior to the shifting of the section 20b to its dotted position. It will be seen that when the section 20b is shifted to the dotted position, the upper thread will no longer be in alinement with the line A'. In Figure 10 I have disclosed a fragmentary sectional view taken across the section 20b when said section has been shifted to the dotted position shown in Figure 9. From Figure 10 it will be apparent that, when the screw section 20b is shifted to the dotted position, the threads thereof will be out of alinement with the threads in the section 22b.

It will be apparent that if the above described misalinement of the threads takes place when the screw section is deflected, a reaming effect upon the threads within the work piece takes place which is very undesirable. In fact, by employing a screw construction of the type disclosed in Figures 9 and 10, the threads in the work piece would be reamed to such an extent as to render the screw ineffective as a satisfactory tightening means.

Screws constructed in accordance with the teachings of my invention are particularly adaptable in instances where the extremity of the screw may project beyond the surface of a work piece after the head of the screw has been clamped in position, as clearly shown in Figure 7. In many instances work pieces, such as the plates 26 and 28, are exposed on one side only, namely, the side against which the head of the screw bears, the opposite projecting end of the screw being covered or in some manner obstructed from view. It is in such instances that screws of my improved construction have a very wide and practical application. Heretofore it has been found necessary in certain types of screws to materially increase the pitch of the thread in order to enable such screws to be driven through the aperture in the work piece. By employing my invention, I am able to provide screws of standard lead and pitch and thereby maintain the locking or clamping effectiveness of the screw after it has served its purpose as a tapping element. Furthermore, screws constructed in accordance with the teachings of my invention may be employed to secure work pieces together which have a thickness considerably greater than the pitch of the thread in the screw. This is to be clearly distinguished from conventional types of self-tapping screws. It should also be observed that the recess provided in the screw is sufficiently small to preclude the possibility of weakening the screw to any appreciable extent. In fact, the portion of the screw which eventually serves to secure the work pieces together, namely, that portion of the screw disclosed in Figure 7, which extends through the plates 26 and 28 has a strength substantially equal to the strength of an unslotted screw. Obviously the portion of the screw body adjacent the upper extremity of the slot does not yield to any appreciable degree, and hence the rigidity and tightening effectiveness of the screw is not impaired when said screw is driven home to the position shown in Figure 7. It will be noted that when the tip of the screw body 18 is initially tapped into the aperture of the work piece, said screw temporarily partakes of a tapered configuration and the screw section 20 yields inwardly so as to alter the normal cylindrical form of said body. However, after the screw has been tightened against the work piece as shown in Figure 7, the screw section 20 springs outwardly to its normal position. Positively no reaming action takes place in the work piece, and hence the screw may be inserted and removed without mutilating or in any way disfiguring the threads in the work piece. This results from the fact that no misalinement of the threads in the sections 20 and 22 takes place during the tapping operation. Obviously my improved screws are designed for use in relatively hard materials, such as metal, phenolic condensation products, fibrous materials, etc., in which the ordinary long lead wood screw cannot be employed. In fact, my screws are adapted for use as a self-tapping element in a wide range of relatively hard materials.

From the foregoing it will also be apparent that when the screw section 20 yields as the result of the frictional engagement thereof with the wall of the unthreaded aperture the companion section 22 will shift so as to cause the cutting edge of said section to cut along a circle of slightly larger diameter than the normal diameter of the screw. Hence, the diameter of the tapped hole is slightly larger than the diameter of the screw threads. Obviously this increase in diameter will be very slight and only sufficient to facilitate the turning of the screw within the work piece. By having the resulting tapped aperture oversize by a few thousandths of an inch, the screw may be turned within the aperture without the application of great force. This result is particularly advantageous in instances where several screws of my improved type are employed to secure a detachable part in position. The normal diameters of the screws will obviously vary to a slight degree but this slight variation is compensated for by reason of the fact that said screws are adapted to cut a slightly oversized thread. Hence, in replacing the screws after a part secured thereby has been removed, said screws may be indiscriminately applied to the apertures or in other words the screw previously removed from one aperture may be readily inserted within one of the other apertures.

It will also be noted that I prefer to so arrange the recess or slot 24 that the included angle between the wall in the screw section 22 and a line which is tangent to the screw periphery at the cutting edge is less at the entering end of the screw than it is at the other or inner portion of the screw. Thus I provide a sharper cutting edge at the entering end of the screw which facilitates the heavy duty cutting action which takes place at this point, and gradually or progressively decrease the sharpness of the cutting edge so that a finishing operation or cut is made at a point spaced from the entering end. Referring to Fig. 2 it is seen that the bottom of the slot 24 is curved, one end thereof opening at the periphery of the screw and the other end terminating at the entering end of the screw. The latter end tangentially approximates a line which is substantially parallel to the screw axis.

The hardness of the screw will depend largely upon the hardness of the material with which the screw is to be used. Obviously for satisfactory operation the screw must be harder than the work in which it is inserted. Suitable heat treatment may be employed to govern the degree of hardness which may be found necessary. It should also be understood that, while I have stressed the idea of employing a slot which is perpendicular to the thread helix in order to obtain the most satisfactory results, the invention is not limited to this particular disposition of the slot, but contemplates other modifications of slots or recesses which render the screw self-tapping. In other words, the invention should only be limited by the scope of the appended claims.

Having thus described my invention, what I claim as new and desire to secure by Letters Patent is:

1. A thread cutting fastener including a body portion provided with a thread, said body including a section having a cutting edge and a yieldable section for increasing the cutting effectiveness of the edge on said other section.

2. A thread cutting fastener including a threaded body portion which is normally circular in cross section, a section of said body having a cutting edge, and a section yieldable transversely with respect to said body for increasing the cutting effectiveness of the edge on the other section.

3. A tapping fastener including a body portion provided with a thread, said body portion being divided into a pair of sections by a longitudinal recess, one of said sections having a cutting edge and the other section being yieldable for increasing the cutting effectiveness of the edge on said other section.

4. A tapping fastener including a threaded body, said body having a recess therein extending longitudinally of the fastener out of parallelism with the axis of said fastener said recess dividing the body into a section having a cutting edge and a yieldable section whereby to increase the cutting effectiveness of the edge on said first section.

5. A tapping fastener including a threaded body, said body having a recess disposed at substantially right angles with respect to the thread helix, one section of the body separated by said recess having a cutting edge and another section separated by said recess being companion to the first section, said sections being relatively movable toward and away from each other without affecting the alinement of the thread portion in said sections.

6. A tapping fastener including a threaded body having a slot partially traversing the same, the plane of said slot being oblique with respect to the axis of the fastener and separating a section having a cutting edge and a section companion thereto, said slot being of sufficient size to permit one of said sections to yield about an axis which is oblique with respect to said fastener axis.

7. A tapping fastener including a threaded body having a head adapted to be clamped against the surface of a workpiece, said body having a slot extending partially through the fastener and opening at the end and to one side thereof, said slot separating the body into a section having a cutting edge and a section companion thereto, said slot being disposed at substantially right angles with respect to the thread helix.

8. A tapping fastener including a threaded body of normally circular cross section, and a head formed integral with said body and adapted to be tightened against the surface of a workpiece, a longitudinal recess in said body presenting a section having a cutting edge and a yieldable section, said latter section being yieldable so as to alter the normal circular cross section of a portion of the body when said fastener is applied to the unthreaded aperture of a workpiece, whereby to increase the cutting effectiveness of the edge on the other section.

9. A tapping fastener including a threaded body, and a head formed integral therewith adapted to be tightened against the surface of a workpiece, said body having a slot traversing the entering end thereof, the depth of the slot at said entering end being at least twice the depth of the threads in the body, the plane of said slot being oblique with respect to the fastener axis and terminating short of the screw head a sufficient distance to maintain the strength of the screw as a tightening element, said slot separating said body into a pair of sections one of which is provided with a cutting edge.

10. A tapping fastener including a threaded body, and a head formed integral with said body adapted to be tightened against the surface of a workpiece, said body having a slot traversing the entering end thereof, the plane of said slot being perpendicular to the thread helix and terminating short of the fastener head a sufficient distance to maintain the strength of the fastener as a tightening element, said slot separating said body into sections one of which is provided with a cutting edge.

11. A thread cutting fastener including a rotatable body having a thread of constant root diameter, and a recess extending longitudinally of the screw and separating said body into companion screw sections, one of which is provided with a cutting edge and the other adapted to yield whereby to increase the cutting effectiveness of said edge when the screw is applied to the unthreaded aperture of a relatively hard workpiece.

12. A tapping fastener having a threaded body and a recess dividing said body into companion sections one of which is provided with a cutting edge, a portion at least of one of said sections having a cross sectional area which is less than the complementary cross sectional area of the other section, the presence of the recess enabling one of said sections to yield toward the other, thereby causing said cutting edge to be positioned slightly eccentric with respect to the center of the aperture to which the fastener is applied so as to cut the thread of a diameter slightly greater than the normal diameter of the thread in said fastener.

13. A tapping fastener including a threaded body, and a recess extending longitudinally thereof and separating said body into companion sections, one of which is provided with a cutting edge, said sections being so made that one has considerably greater flexibility in comparison to the other.

14. A tapping fastener including a threaded body having a head adapted to be tightened against the surface of a workpiece, and a recess extending longitudinally of the body, said recess separating the body into sections one of which is provided with a cutting edge operable to cut a complementary thread within an unthreaded aperture of a relatively hard workpiece, the portion of the recess at the entering end of the fastener being deeper than the remaining portion of the recess.

15. A tapping fastener including a threaded body and a recess extending longitudinally thereof separating the body into sections one of which is provided with a cutting edge, said cutting edge being adapted to cut a complementary thread within a relatively hard workpiece, a portion of the recess being of a depth greater than the radius of the screw and said recess being narrow at the bottom for concentrating the flexure.

16. A tapping fastener including a threaded body, and a recess extending longitudinally thereof separating said body into sections one of which is provided with a cutting edge adapted to cut a complementary thread within a relatively hard workpiece, the bottom of the recess being curved, one end of the bottom terminating at the periphery of the fastener body and the other end tangentially approximating a line substantially parallel to the screw axis.

17. A tapping fastener including a threaded body, a recess extending longitudinally of the body presenting a section having a cutting edge, the included angle which forms the cutting edge at the entering end of the fastener being less than the included angle at a point spaced from said entering end.

18. A tapping fastener including a threaded body, a recess extending longitudinally of the body presenting a section having a cutting edge, the included angle which forms the cutting edge progressively increasing from the entering end of the fastener toward the opposite end thereof.

In witness whereof, I have hereunto subscribed my name.

GEORGE C. TROTTER.